INVENTORS
Bernard Alfred Gough
Arthur Frank Baldwin
by Benj. T. Rauber
their attorney

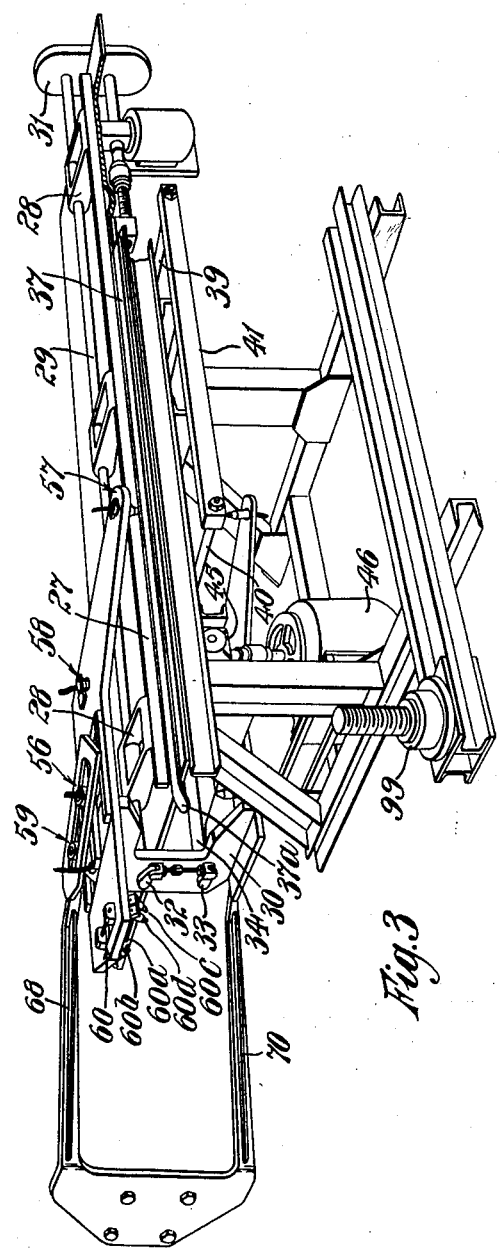

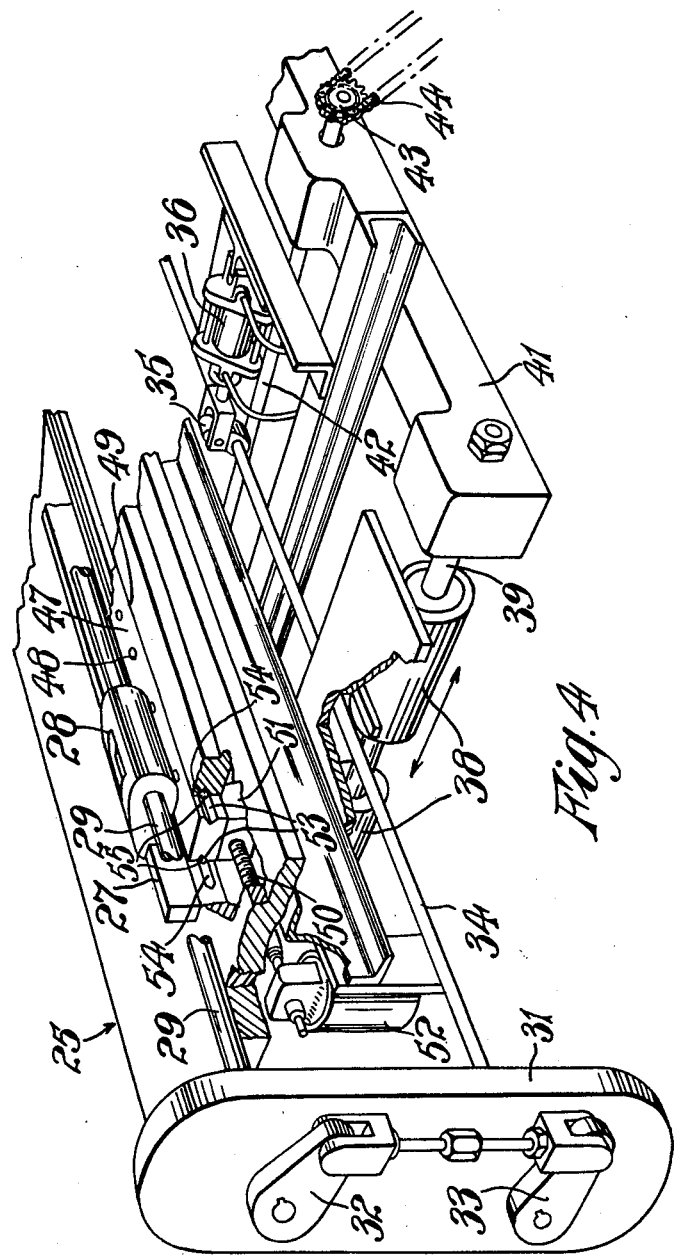

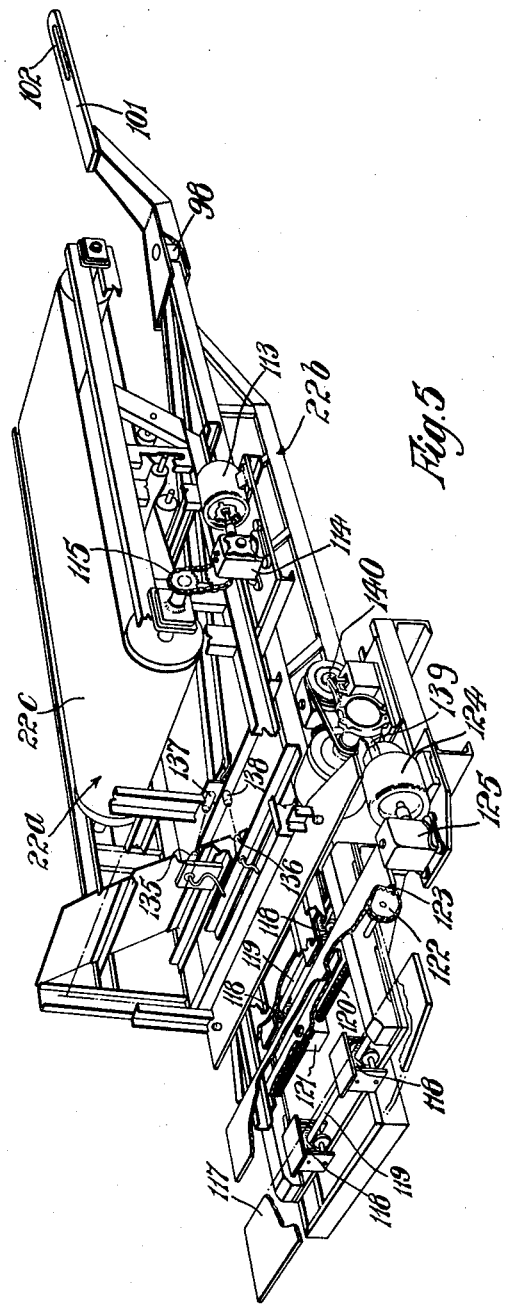

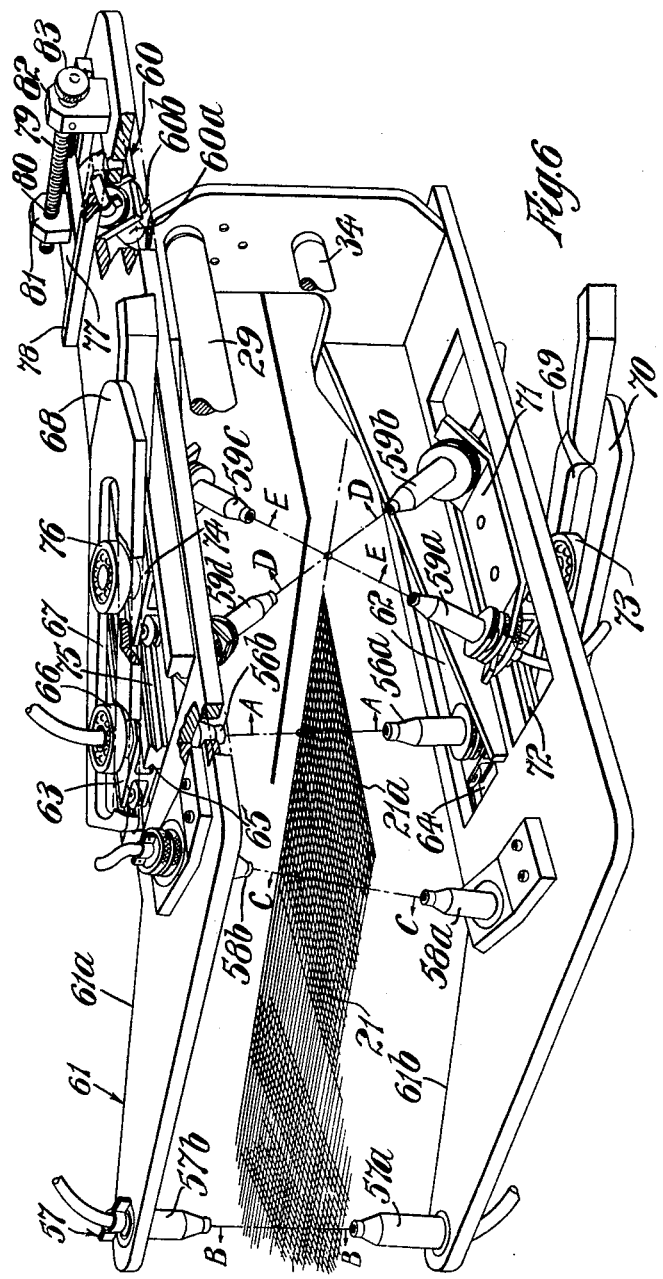

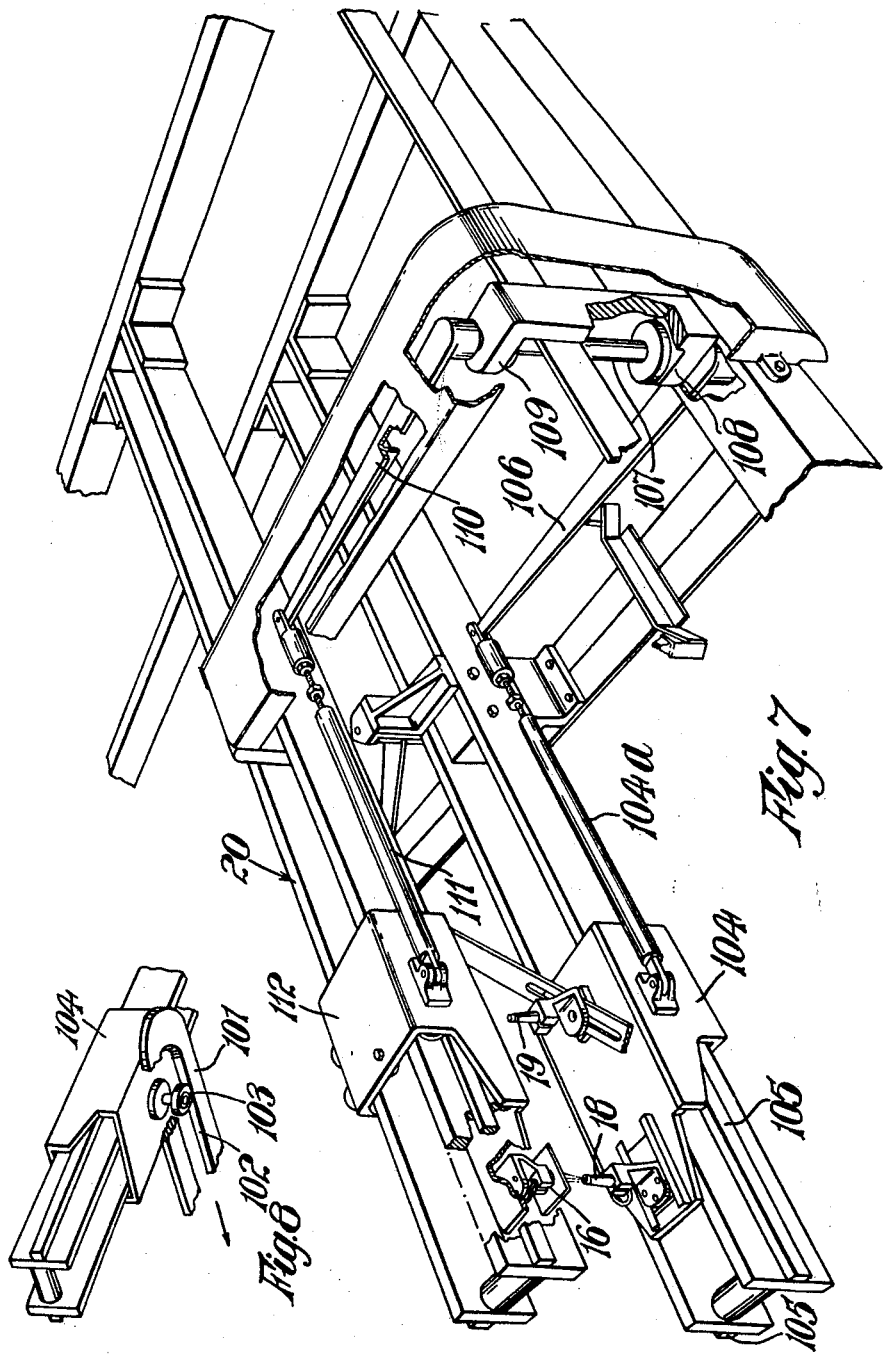

July 21, 1964 B. A. GOUGH ETAL 3,141,805
APPARATUS FOR CONVEYING AND JOINING
LENGTHS OF RUBBERIZED FABRIC
Filed Aug. 10, 1959 8 Sheets-Sheet 8

INVENTORS
Bernard Alfred Gough
Arthur Frank Baldwin
by Benj. T. Dauber
their attorney

United States Patent Office 3,141,805
Patented July 21, 1964

3,141,805
APPARATUS FOR CONVEYING AND JOINING LENGTHS OF RUBBERIZED FABRIC
Bernard Alfred Gough, Stechford, Birmingham, and Arthur Frank Baldwin, Great Barr, Birmingham, England, assignors, by mesne assignments, to Dunlop Tire and Rubber Corporation, Buffalo, N.Y., a corporation of New York
Filed Aug. 10, 1959, Ser. No. 832,704
Claims priority, application Great Britain Aug. 13, 1958
21 Claims. (Cl. 156—353)

This invention relates to conveyors.

In the manufacture of pneumatic tyres, bias-cut lengths of rubberized fabric are assembled upon a tyre building drum in the form of pockets or single plies. These lengths of fabric are bias-cut from a long, rolled length by means of a traversing power-driven circular knife while the fabric is mounted upon a conveyor, the cut lengths being lifted from the conveyor by two operators, placed on a joining table and manually aligned and joined end-to-end to be assembled eventually, on a drum, to form a pocket for a tyre carcass.

It is an object of the present invention to provide conveying and joining apparatus which will eliminate the above-mentioned manual handling and joining operations.

It is a further object of the invention to provide a method of joining lengths of materials mounted on a conveyor and removing the joined lengths therefrom.

According to the invention apparatus for conveying and joining lengths of rubberized fabric comprises a main conveyor, means for intermittently driving the main conveyor to bring single lengths of fabric successively to a joining position, a clamping member located in the joining position and disposed so as to clamp onto a marginal portion of a length of fabric mounted on the main conveyor to join it to the marginal portion of a second length of fabric disposed beneath the clamping member, means for alternatively raising and lowering the clamping member to move it clear of and to clamp it upon the said marginal portions, and means for intermittently withdrawing joined lengths of fabric so that an unjoined marginal portion remains in the joining position.

Further, according to the invention apparatus for conveying and joining lengths of rubberized fabric comprises a main conveyor, means for bias-cutting rubberized fabric mounted on the main conveyor into lengths, means for intermittently driving the main conveyor to bring single lengths of bias-cut fabric successively to a joining position, a clamping member located in the joining position and disposed so as to clamp onto a marginal portion of a bias-cut length of fabric mounted on the main conveyor to join it to the marginal portion of a second bias-cut length of fabric disposed beneath the clamping member, means for lowering the clamping member to move it clear of and to clamp it upon the said marginal portions, and means for intermittently withdrawing, sideways, joined lengths of fabric so that an unjoined marginal portion remains in the joining position.

According to the invention also a method fo joining lengths of rubberized fabric mounted on a main conveyor and removing the joined lengths therefrom comprises intermittently conveying single lengths of the fabric successively to a joining position, joining a marginal portion of a length of fabric to a marginal portion of a preceding length of fabric previously withdrawn from the main conveyor and supported in a position so that a marginal portion thereof is overlapped by a marginal portion of a succeeding length when conveyed into the joining position and intermittently withdrawing the joined lengths so that an unjoined marginal portion of a joined length remains in the joined position.

The apparatus and method according to the invention may be for joining lengths of rubberized fabric and withdrawing them either sideways or endways with respect to a main conveyor upon which the lengths of fabric are mounted.

One embodiment of the invention will now be described with reference to the accompanying drawings in which:

FIGURE 3 is a perspective view of ply joining apparatus forming part of the apparatus shown in FIGURES 1 and 2;

FIGURE 4 is a perspective view of the ply joining apparatus shown in FIGURE 3, viewed from the opposite side to that shown in FIGURE 3;

FIGURE 5 is a perspective view of a take-off conveyor forming part of the apparatus shown in FIGURES 1 and 2, viewed from the end remote from the ply joining apparatus shown in FIGURES 3 and 4;

FIGURE 6 is a perspective view showing the positions of photoelectric cells associated with the ply joining apparatus shown in FIGURE 3;

FIGURE 7 is a scrap perspective view showing supporting apparatus and photoelectric cells associated with the bias-cutting apparatus;

FIGURE 8 is a scrap perspective view showing part of the supporting apparatus shown in FIGURE 7 and part of the conveyor shown in FIGURE 5;

Figure 1:
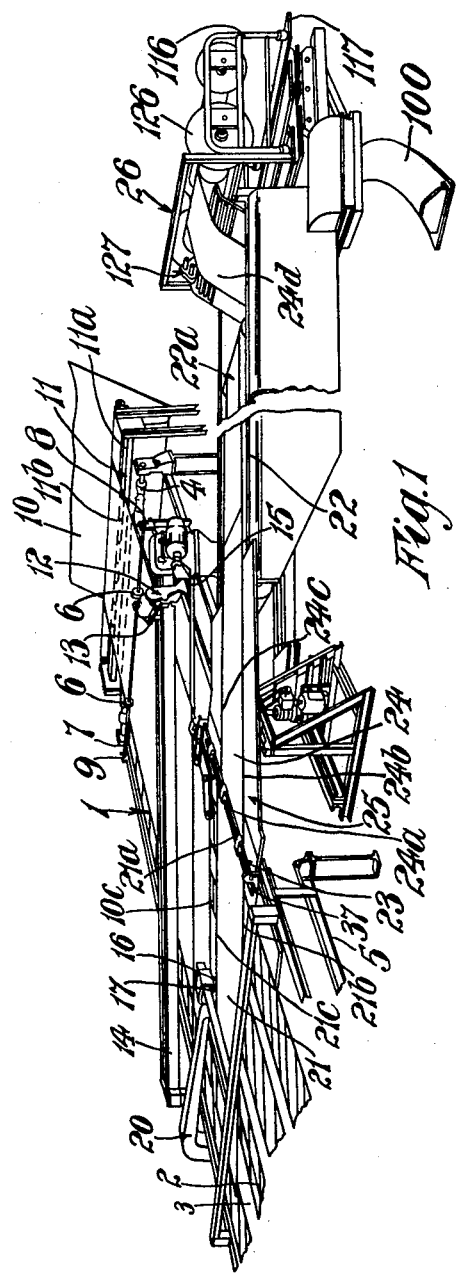
FIGURE 1 is a perspective view of apparatus for bias-cutting tyre plies from a length of fabric, conveying the plies, joining the plies and taking-off the joined plies.

The general arrangement of the apparatus is best shown in FIGURE 1 and the apparatus will now be briefly described.

A main belt conveyor 1 comprising four narrow endless belts 2 separated by gaps 3 is supported horizontally by a roller 4 at one end of a machine frame 5, and at the other end by a driven roller (not illustrated). A pair of rollers 6, rotatably supported on a rod 7 carried by brackets 8 and 9, is provided for pressing a sheet of rubberized parallel-cord fabric 10, which is to be severed by the apparatus into bias-cut plies for tyre building, into engagement with the belts 2 so that the sheet 10 may be driven by the conveyor 1. A vacuum clamp 11 in the form of a tube 11a having perforations 11b, and to which a vacuum pump (not illustrated) is connected, is provided for holding the fabric 10 stationary when required in the operation of the machine. The brackets 8 and 9 are each provided with a pneumatically operated cylinder and piston (not illustrated) for automatically lifting the rod 7 and thus the rollers 6 when the vacuum clamp is operated. A knife mechanism 12, comprising a carriage 13 mounted to run across the conveyor 1 on a track 14 disposed at a predetermined angle to the longitudinal direction thereof, carries a rotatable circular knife 15, for cutting the fabric 10.

A pair of photoelectric cells 16 and 17, and associated lamps 18 and 19, respectively (see FIGURE 7) are mounted on a supporting framework 20. The cell 16 and light source 18 is provided for actuating an electrical circuit for slowing down the conveyor 1 when a predetermined length of fabric 10 has been fed past the edge of the knife blade 15. The cell 17 and light source 19 is provided for actuating an electrical circuit and associated mechanism for operating the vacuum clamp 11 when the required length of fabric 10 has been fed past the edge of the knife blade 15.

In order to remove the lengths of bias-cut material 21 produced by the apparatus as described above, a take-off conveyor 22, arranged parallel to the knife track 14, is provided. A clamp mechanism 23 is provided for joining the marginal portions, or edges 21a, of newly-severed lengths of material 21 to the marginal portion, or end 24a, of a continuous strip 24, formed from previously joined lengths 21 and supported partly by the conveyor 22, and partly by a table 25. A reel-up unit 26 for the strip 24 is provided at the output end of the conveyor 22.

Both the main conveyor 1 and the table 25 are provided with orifices (not shown) connected to a source of compressed air for providing "air flotation" beneath the ply 21 and the strip 24 to facilitate the removal of the ply and to avoid possible distortion of the ply when it is pulled across the conveyor 1 and the table 25 by the action of the take-off conveyor 22. The orifices are arranged to direct upward jets of air beneath the ply 21 at points distributed over its area.

The operation of the apparatus briefly described above will now be outlined:

The conveyor 1 is operated to feed a length of the fabric 10 past the edge of the knife blade 15, the rollers 6 being engaged with the fabric, and the vacuum clamp 11 being out of operation. When a predetermined length of fabric 10 has passed the edge of the knife blade 15 the leading edge of the fabric first interrupts the path of light from the source 18 to the cell 16, causing the cell 16 to actuate the electrical circuit for slowing down the conveyor 1, and then interrupts the path of light from the source 19 to the cell 17, causing the cell 17 to actuate the electrical circuit and associated mechanism for operating the vacuum clamp 11 and disengaging the rollers 6 from the fabric.

The conveyor 1 continues moving until a previously cut ply 21 is adjacent to the take-off conveyor 22, when it is stopped by electrical circuits and associated mechanism controlled by a photoelectric device to be described. The knife mechanism 12 is drawn across the conveyor 1 to sever the fabric and thus produce a severed length (or ply) of fabric 21, and the previously cut ply is taken off the conveyor 1 by the take-off conveyor 22 as will be described below.

The conveyor 1 is now restarted with the vacuum clamp 11 still in operation and the rollers 6 disengaged. After a short, predetermined, interval, sufficient to allow a gap 10c to be formed between the severed ply 21 and the remainder of the fabric 10, the fabric 10 is released by the clamp 11, and the rollers 6 are engaged to drive the fabric together with the conveyor. The clamp 11 is applied when the leading edge 10b of the fabric 10 reaches the photoelectric cell 17 and the conveyor 1 is again stopped when the ply 21 is in the position shown in FIGURE 1 adjacent to the take-off conveyor 22. The clamp mechanism 23 is operated to join the newly severed ply 21 to the strip 24 on the table 25, the take-off conveyor 22 then withdrawing the ply 21 from the main conveyor 1.

The reel-up unit 26 operates automatically to withdraw the strip 24 from the output end 22a of the conveyor 22, and the conveyor 1 is re-started when the ply 21 is clear thereof.

The apparatus will now be described in greater detail:

The clamp mechanism 23 (see FIGURES 1, 3 and 4) comprises a clamping member in the form of a bar 27, carried by arms 28 mounted on a shaft 29 pivotally supported at its ends on brackets 30, 31, attached to the table 25, the bar 27 being parallel with the longitudinal direction of the conveyor 1. The shaft 29 is rotatable by a pair of levers 32, one attached to each end of the shaft 29, each lever 32 being linked to one of a pair of levers 33, the levers 33 being attached one to each end of a rotatable shaft 34. The shaft 34 is coupled by a lever 35 to a pneumatic piston and cylinder 36. The bar 27 may thus alternatively be held in a raised position or lowered and pressed downwards towards the table 25 by operation of the piston and cylinder 36, causing rotation of the shaft 34 and hence of the shaft 29 via the linked levers 32 and 33. The table 25 is provided, adjacent to the bar 27, with a second bar 37 having a downwardly curved end 37a. The bar 37 is arranged, in the operation of the apparatus, to lie under the edge 21a of a ply 21. When the ply is in position (as shown in FIGURE 1) ready to be clamped to the strip 24, the edge 21a projects beyond the bar 37 and over the end 24a so that when the bar 27 is lowered the edge 21a will be secured to the end 24a of the strip 24.

In order to maintain the clamp mechanism 23 in a required position relative to the edge 21a of the ply 21 (see FIGURE 2), the table 25 is adjustable transversely with respect to the conveyor by the following mechanism (see FIGURES 3 and 4). The table 25 is mounted on bearings 38 carried on a pair of shafts 39 and 40 fixed to a supporting framework 41. The shafts 39 and 40 are perpendicular to the longitudinal direction of the conveyor 1, and thus the table 25 is slidable towards or away from the conveyor 1 on the bearings 38. A lead screw 42 mounted on the framework 41 is engaged with a nut (not illustrated) attached to the table 25, and is drivable via a sprocket 43, chain drive 44 and gearbox 45 by an electric motor 46.

In order to ensure that the lateral edges 24b and 24c of the strip 24 (see FIGURE 2) of fabric are aligned with the corresponding edges 21b and 21c of the strip 21 which is in the joining position, an aligning bar 47 is provided for adjusting the position of the end 24a of the strip 24. The upper surface of the bar 47 is flush with the surface of the table 25 and is provided with holes 48 connected via conduits and a valve (not shown) to a vacuum pump (not shown). The bar 47 is slidable in a recess 49 in the table 25 in a direction parallel to the longitudinal direction of the conveyor 1 by means of a lead screw 50, engaged with a screw threaded block 51 attached to the bar 47, and rotatable by means of an electric motor 52, the bar 47 having V-grooves 53 corresponding with V-grooves 54 in the sides of the recess 49 and ball-bearings 55 being provided between the grooves 53 and 54. By application of vacuum to the holes 48, the fabric at the end 24a of the strip 24 may be clamped to the bar 47. The bar 47 may then be slid in the recess 49 by the means described above to adjust the positions of the lateral edges 24b and 24c of the strip 24 at its end 24a, to bring the said edges into alignment with the corresponding edges 21b, 21c of the ply 21.

The apparatus just described for clamping the plies 21 to the strip 24, and the take-off conveyor 22 and associated apparatus are controlled by five photo-electric cell units 56–60, mounted on a framework 61 (see FIGURES 2, 3 and 6), which will now be described, first in outline and then in detail.

The cell unit 56 is provided for stopping the movement of the main conveyor 1 and for causing the clamp mechanism 23 to operate when the trailing edge 21c of a ply 21 crosses its optical axis.

Referring to FIGURE 6 it will be seen that the framework 61 comprises an upper plate 61a, and a lower plate 61b. The lower plate 61b extends below the upper surface of the conveyor 1 and the upper plate 61a above the said surface.

The cell unit 56 comprises a light source 56a and a photoelectric cell 56b, the light source and the cell being mounted on sliding members 62 and 63 respectively which are slidable longitudinally with respect to the conveyor 1 in slides 64 and 65 respectively. The optical axis of the cell unit 56 is indicated by the line A—A. The sliding member 63 is provided with a bearing 66 slidable within a slot 67 in a bar 68. The sliding member 62 is provided with a bearing (not illustrated) slidable within a slot 69 in a bar 70. The bars 68 and 70 are parallel to one another and are attached at their ends remote from the cell unit 56 to a frame 22b which carries the conveyor 22. The slots 67 and 69 respectively in the bars 68 and 70 are aligned with the longitudinal direction of the take-off conveyor 22 and serve to keep the cell units 56 and 59 in alignment with one another and with the said direction, whatever the orientation of the conveyor 22 relative to the conveyor 1.

The cell unit 57 is provided for slowing down the take-off conveyor 22 when the edge 21d of the ply 21 crosses its optical axis, and the cell unit 58 is provided for stopping the take-off conveyor when the edge 21d has just passed the bar 37.

The cell unit 57 comprises a light source 57a and a photoelectric cell 57b, and the cell unit 58 comprises a light source 58a and photoelectric cell 58b. The optical axis of the cell unit 57 is indicated by the line B—B, and the optical axis of the cell unit 58 is indicated by the line C—C (see FIGURE 6).

The cell unit 59 is provided for causing the position of the end 24a of the strip 24 to be adjusted, if necessary, after the take-off operation is complete, by means of the aligning bar 47 to ensure that the edges 24b and 24c of the strip 24 are aligned with the positions in which the edges 21b and 21c respectively of the next ply 21 will be stopped by the action of the cell unit 56.

The cell unit 59 comprises two light sources 59a and 59b and two photoelectric cells 59c and 59d, corresponding to the sources 59a and 59b respectively. The optical axis of the cell 59d and light source 59b is indicated by the line D—D, and the optical axis of the light source 59a and photoelectric cell 59c is indicated by the line E—E. The optical axes D—D and E—E cut the plane of the strip 24 in two separate closely adjacent points, one on each side of a continuation of the line at which the edge 21c of a ply 21 will lie when stopped in the take-off position by the cell unit 56.

This arrangement enables electronic apparatus of conventional design (not illustrated) associated with the cells 59c and 59d to control the operation of the motor 52, to cause the edge 24c of the strip 24 to be moved, if necessary, into alignment with the said line. The motor 52 is controlled by the electronic apparatus to drive the lead screw 50 in the appropriate direction until the edge 24c of the strip 24 lies between the points at which the plane of the strip 24 is cut by the optical axes D—D and E—E, one cell then being illuminated and the other dark.

The light sources 59a and 59b are mounted on a sliding member 71 slidable with respect to the conveyor 1 longitudinally within a slide 72, the sliding member 71 being provided with a bearing 73 engaging the slot 69 in the bar 70. The photoelectric cells 59c and 59d are mounted on a sliding member 74, slidable within a slide 75 longitudinally with respect to the conveyor 1. The sliding member 74 is provided with a bearing 76 slidable within the slot 67, in the bar 68.

The slides 64, 65 and 72, 75 associated with the cell units 56 and 59 respectively are aligned with the longitudinal direction of the conveyor 1 to maintain the cell units 56 and 59 in predetermined lateral positions with respect to the table 25.

The cell unit 60 is provided for causing the table 25 to be moved towards or away from the conveyor 1 during operation of the take-off conveyor, in order to ensure that the overlap of the edge 21a of the ply 21 above the end 24a of the strip 24 is of a predetermined size.

The cell unit 60 comprises two light sources 60a and 60b and associated photoelectric cells 60c and 60d respectively (see FIGURE 3). The surface of the conveyor 1 immediately beneath the cell unit 60 is provided with a polished aluminium plate, and the arrangement of the cells 60c and 60d and their corresponding light sources is such as to produce the same effect as that produced by the cell unit 59. The only difference between the cell unit 60 and the cell unit 59 is that both the light sources 60a and 60b and their corresponding cells 60c and 60d are mounted above the conveyor surface, the polished aluminium plate acting as a mirror to give a similar disposition of the optical axes of the cells and light sources, relative to the edge of a length of fabric, to that shown for the cell unit 59.

The cells 60c and 60d are connected to electronic apparatus (not illustrated) for controlling the motor 46, to drive the table 25 by the apparatus described towards or away from the conveyor 1 until the two optical axes of the cell unit 60 are situated one on each side of the edge 10a of the fabric 10 on the conveyor 1.

The cell unit 60 is mounted on a sliding member 77 which is slidable in a direction perpendicular to the longitudinal direction of the conveyor 1 along a slide 78 by means of a screw-threaded rod 79 engaged with a screw threaded hole 80 in a block 81 attached to the sliding member 77, the rod 79 being secured against axial movement in a block 82 attached to the plate 61a, the screwed rod 79 being provided with a knurled knob 83. This arrangement enables the size of the overlap of the edge 21a of the ply 21 above the end 24a of the strip 24 to be adjusted by varying the position of the cell unit 60 with respect to the main conveyor, and thus causing the table 25 to move towards or away from the conveyor 1.

Figure 10:
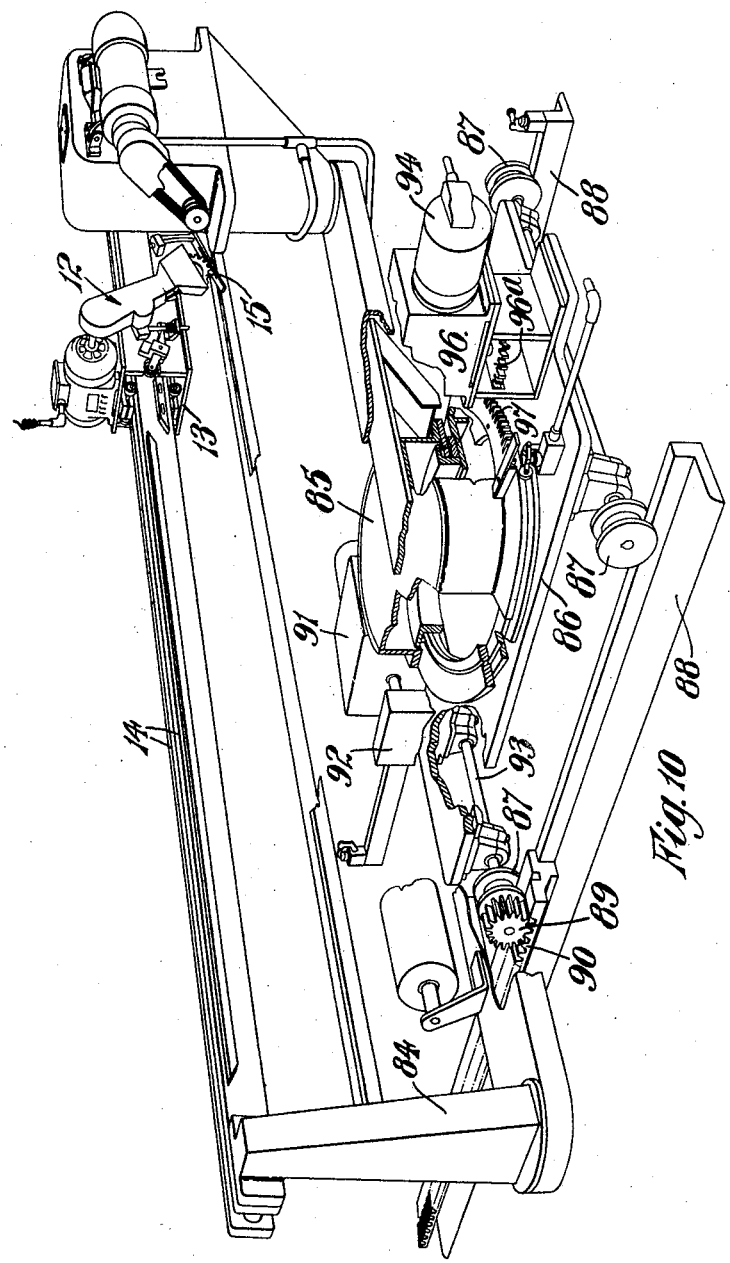
FIGURE 10 is a perspective view of a cutting knife and associated apparatus, forming part of the apparatus shown in FIGURES 1 and 2.

In order to permit variation in the width and bias angle of the plies 21 cut by the knife mechanism 12, the knife track 14 is movable longitudinally of the conveyor 1, and the angle which the track 14 makes with the longitudinal direction of the conveyor is adjustable, these adjustments being effected by means of the following apparatus (see FIGURE 10).

The knife track 14, FIG. 10, is carried by a framework 84 supported on a turntable 85 mounted beneath the conveyor 1 on a trolley 86, the trolley 86 being movable axially of the conveyor 1 on four wheels 87 running on a pair of rails 88. The trolley 86 is drivable in the longitudinal direction of the conveyor 1 by a pinion 89 attached to one of the wheels 87, and engaged with a rack 90 attached to one of the rails 88, and by a second similar pinion and rack (not illustrated) associated with the other rail 88. The pinions 89 are drivable by means of a motor 91 coupled by a gear box 92 to an axle 93 which supports both the pinions 89 and the associated wheels 87. The adjustment of the angle which the track 14 makes with the longitudinal direction of the conveyor 1 is effected by rotation of the turntable 85 by means of a motor 94 drivably connected via a gear box 96 and a pinion 96a to a toothed quadrant 97 attached coaxially to the turntable 85.

When the angle of bias of the plies 21 is changed, it is necessary also to change the angle at which the conveyor 22 is orientated with respect to the conveyor 1 by the same amount. In order that this adjustment may be made the construction of the conveyor is as follows (see FIGURE 5).

The supporting frame 22b is pivotally attached to the main conveyor frame 5 by a bearing 98 mounted on a pivot 99 (see FIGURE 3). The end of the frame 22b remote from the main conveyor 1 is mounted on wheels (not illustrated) which are free to roll on a floor plate 100 in an arc about the axis of the pivot 99.

An extension 101 to the take-off conveyor frame 22b is provided with a slot 102 the longitudinal axis of which is disposed parallel to that of the take-off conveyor, in engagement with a bearing 103 attached to a carriage 104 on which are mounted the light sources 18 and 19 for the photoelectric cells 16 and 17 respectively (see FIGURES 7 and 8). The carriage 104 is constrained to move along a pair of rails 105 attached to the framework 20 with the longitudinal axis of the rails parallel to that of the main conveyor 1.

The carriage 104 is coupled via a connecting rod 104a and a lever 106 to the lower end of a shaft 107 pivotally supported vertically in bearings 108 and 109 attached to the framework 20. A lever 110 is attached to the upper end of the shaft 107, and is coupled by a connecting rod 111, to a carriage 112 on which are mounted the photoelectric cells 16 and 17.

The positions of the cells 16 and 17 and the light sources 18 and 19 are, therefore, automatically adjustable longitudinally with respect to the main conveyor upon angular movement of the conveyor 22 about the pivot 99. The adjustment of the positions of the cells ensures that the cell 16 will operate to stop the fabric 10 with its leading edge 10b in a fixed position relative to the cell 56, whatever the bias angle or width of the ply 21 to be cut. In the subsequent movement of the conveyor 1, the distance travelled by the conveyor, after the fabric 10 has been gripped by the clamp 11, to bring the trailing edge 21c of the previously-cut ply 21 into line with the cell unit 56 is thus kept to a minimum.

The conveyor 22 (see FIGURES 1 and 5) comprises a frame 22b, as described above, having a belt 22c mounted thereon and drivable by means of an electric motor 113, gearbox 114 and chain drive 115. At the output end 22a of the conveyor 22 (see FIGURE 1) a framework 116 is mounted on a platform 117, the platform 117 being mounted on four rollers 118 running on a pair of rails 119 attached to the conveyor frame 22b. The platform 117 is movable transversely with respect to the conveyor 22 on the rollers 118 by means of a lead screw 120, mounted in the frame 22b, engaging a screwed block 121 fixed to the platform. The lead screw 120 is drivable via a sprocket 122 and chain 123 by a motor 124 and gearbox 125.

Figure 9:
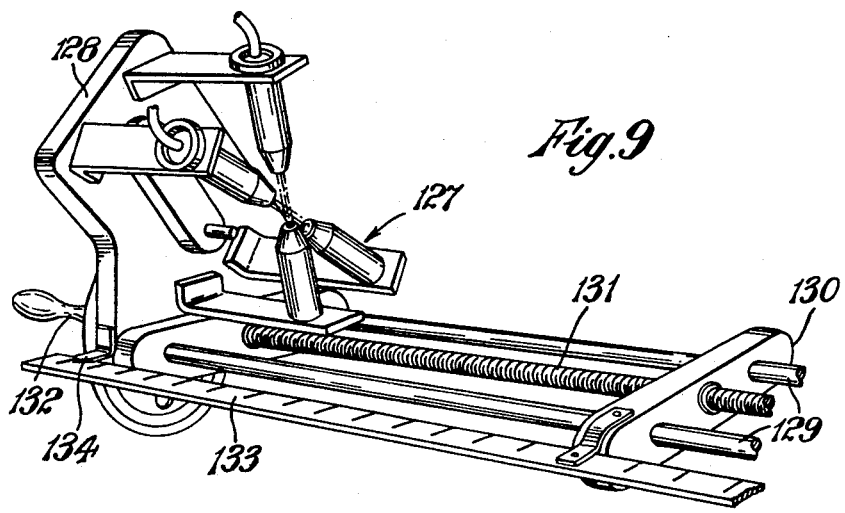
FIGURE 9 is a scrap perspective view of apparatus associated with the take-off conveyor shown in FIGURE 5.

The framework 116 carries a take-up spool 126 for the strip 24 and an associated drive motor (not shown). A photoelectric cell unit 127 similar in design to the cell unit 59 described above is attached to the framework 116 in a position for its optical axes (see FIGURE 9) to be aligned one on each side of one of the lateral edges of the strip 24. The cell unit 127 is connected to electronic apparatus of well-known design (not shown) so as to actuate the motor 124 to drive the platform 117 carrying the framework 116 and the spool 126 in an appropriate direction to bring the optical axes of the cell unit 127 into line with the edge of the strip 24, thus providing automatic means for centralizing the strip 24 on the spool. The cell unit 127 is mounted on a carriage 128 which is slidable transversely with respect to the conveyor 22 on slides 129, slidably supported in a bracket 130 attached to the framework 116. The position of the cell unit 127 relative to the framework 116 and thus of the spool 126, is adjustable by means of a lead screw 131 drivably engaged with a handwheel 132, and is measurable by means of a scale 133 attached to the framework 116 and a pointer 134 attached to the carriage 128. The provision for adjustment of the position of the cell unit allows the centralizing apparatus to be used for reeling-up strips 24 of different widths.

Photoelectric cells 135 and 136 and corresponding light sources 137 and 138 respectively (see FIGURE 5) are provided for operating, via a conventional electronic circuit (not illustrated), the drive motor (not illustrated) for the spool 126. The cell 136 is provided to actuate the electronic circuit when a beam of light from the source 138 is broken by the loop 24d (see FIGURE 1) of the fabric strip 24 when this loop reaches a predetermined size, and thus to cause the motor for driving the spool 116 to operate when this occurs. The cell 137 is provided for stopping the motor when the size of the loop 24d has been reduced by a predetermined amount, the operation of the cell 137 being initiated when the light from the source 136 is allowed to reach the cell.

The motor 139 and gearbox 140 is provided for driving the wheels (not illustrated) for moving the conveyor 22 about the pivot 99.

Figure 2:
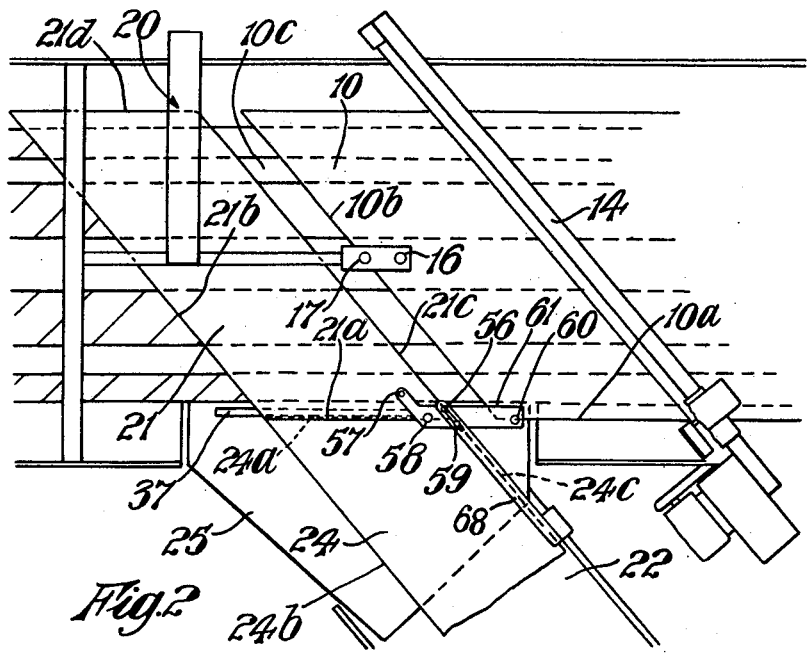
FIGURE 2 is a diagrammatic plan view of part of the apparatus shown in FIGURE 1.

The sequence of operation of the apparatus will now be described, starting from the state shown in FIGURE 2, i.e. with the apparatus set as previously described to give a cut ply of the required width and bias angle, with the main conveyor 1 stationary, the clamp mechanism 23 having been operated to join the edge 21a of the ply 21 to the end 24a of the strip 24, with the conveyor 22 about to operate to withdraw the ply 21 and with the vacuum clamp 11 in operation:

The compressed air for providing air "flotation" is switched on, and the take-off conveyor 22 is started, to withdraw the ply 21 from the main conveyor 1. When the trailing edge 21d of the ply 21 passes the cell unit 57, the cell unit 57 operates electronic circuits to slow down the speed of the take-off conveyor 22, and when the trailing edge 21d of the ply 21 is aligned with the cell unit 58, the take-off conveyor is stopped.

During operation of withdrawal of the ply 21, before the trailing edge 21d, of the ply 21 reaches the cell unit 57 the knife mechanism 12 is operated to cut the next ply of fabric, and the cell unit 60 is in operation, actuating the motor 46 to drive the table 25 towards or away from the main conveyor 1 in order to set the bar 37 in a position to provide a predetermined overlap of the edge 21a over the bar 37 when the next ply 21 reaches the take-off position.

When the ply 21, now forming part of the strip 24, has been completely removed from the main conveyor 1, the main conveyor is re-started at a fast forward speed. The vacuum clamp 11, however, remains in operation for an instant sufficient to produce a gap between the newly-cut ply and the remainder of the fabric 10, equal in extent to the gap 10c shown in FIGURE 2. The vacuum clamp 11 is then released and the rollers 6 are lowered into contact with the fabric 10 to cause the fabric 10 to be driven by the main conveyor 1.

During fast forward movement of the main conveyor, the cell unit 59 is in operation to actuate the motor 52 to drive the aligning bar 47 longitudinally with respect to the main conveyor 1 in a direction so as to bring the edge 24c of the strip 24 into alignment with the cell unit 59 and thus into alignment with the line along which the trailing edge of the newly cut ply will lie when stopped in the take-off position. The holes in the aligning bar 57 are connected to the vacuum pump during this operation, so as to grip the fabric of the strip 24.

When the leading edge of the fabric 10 crosses the optical axis of the cell unit 16, the main conveyor 1 is slowed down by the electronic apparatus associated with the cell unit, and the vacuum clamp 10 is actuated when the leading edge 10b reaches the optical axis of the cell unit 17 to hold the fabric 10 in position ready for cutting. The main conveyor continues at the slow speed until the trailing edge of the newly-cut ply (corresponding to the trailing edge 21c of the ply 21, shown in FIGURE 2) crosses the optical axis of the cell unit 56. The cell unit 56 actuates electronic apparatus to stop the main conveyor 1.

The clamp mechanism 23 is actuated by the cell unit 56, to join the newly-cut ply to the end of the strip 24. The apparatus and the fabric thereon is now in the state shown in FIGURE 2 and is ready for the commencement of a further cycle of operations, the cycles following one another continuously.

At the end of the conveyor 22 the cells 135 and 136 operate, to cause the drive motor for the spool 126 to rotate the spool and take-off the fabric strip 24, as it is produced. The cell unit 127 operates during the take-up of the strip 24 to control, via the motor 124, the position of the framework 116 in the transverse direction of the conveyor 22 to centralize the strip 24 as it is wound onto the spool 126.

It will be appreciated that use of the apparatus just described obviates the need for manual handling and ply joining operations, the apparatus providing a spool of cut and joined plies.

Having now described our invention, what we claim is:
1. Apparatus for conveying and joining lengths of rubberized fabric comprising an endless belt conveyor to convey said fabric at successive intermittent intervals for severing into successive lengths, means for bias-cutting rubberized fabric mounted on the endless belt conveyor into a length at each interval, means controlled by the leading edge of the fabric beyond said cutting means to arrest the movement of said fabric prior to cutting while a severed length is moved to position for joining to a previously severed length, means controlled by the leading edge of each successive severed length of fabric beyond said position of cutting to stop said conveyor in position for joining to a previously severed length, a clamping member located in the joining position and disposed so as to clamp onto a marginal portion of a length of fabric mounted on the endless belt conveyor to join it to the marginal portion of a second length of fabric disposed beneath the clamping member, means for alternatively raising and lowering the clamping member to move it clear of and to clamp it upon the said marginal portions, and means for intermittently withdrawing, sideways relative to the direction of the endless belt conveyor, joined lengths of fabric so that an unjoined marginal portion remains in the joining position.

2. Apparatus according to claim 1 having means disposed on the endless belt conveyor adjacent to the joining position and having a plurality of orifices for directing upward jets of air beneath a length of fabric when in the joining position at points distributed over the area of the length.

3. Apparatus according to claim 1 wherein the clamping member comprises a rigid bar and the means for alternatively raising and lowering the bar comprises a shaft rigidly connected to the bar in spaced parallel relationship therewith, said shaft being rotatably supported in parallel relationship to the endless belt conveyor, and means for rotating said shaft in either direction about its longitudinal axis.

4. Apparatus according to claim 1 wherein the means for intermittently withdrawing, sideways, joined lengths of fabric comprises a take-off conveyor arranged with its longitudinal direction at an angle to the longitudinal direction of the endless belt conveyor and having one end adjacent to said joining position.

5. Apparatus according to claim 4 wherein the means for bias-cutting the rubberized fabric is pivotally mounted on a turntable whereby the angular disposition of the said means with respect to the longitudinal direction of the endless belt conveyor can be adjusted, said turntable being carried by a trolley constrained to move longitudinally with respect to the endless belt conveyor.

6. Apparatus according to claim 4 wherein a table is provided between the endless belt conveyor and the take-off conveyor, said table carrying the clamping member, means being provided for moving the table towards or away from the endless belt conveyor.

7. Apparatus according to claim 6 wherein the means for moving the table comprises a support on which the table is slidable, a screw-threaded nut attached to the table, and a lead screw in engagement with the nut and carried by the support, and an electric motor, the lead screw being rotatable by said electric motor.

8. Apparatus according to claim 7 having an electronic circuit comprising said motor and a photoelectric cell unit attached to the table and comprising a photoelectric cell and a light source for causing the motor to move the table in the required direction until the marginal portion of the length of fabric mounted on the endless belt conveyor intersects the beam of light from the said light source.

9. Apparatus according to claim 6 means for aligning a length of fabric disposed beneath the clamping member with a length of fabric mounted on the endless belt conveyor, said means comprising a bar slidable longitudinally with respect to the endless belt conveyor in a guide attached to the table adjacent to the clamping member, said bar having a plurality of orifices for connection to a vacuum pump and for holding by vacuum the fabric to the bar, and means for moving the bar comprising a lead screw carried by the table in engagement with a screw-threaded block attached to the bar.

10. Apparatus according to claim 9 having an electric motor drivably connected to the lead screw associated with the bar and means for controlling the motor, said means comprising a photoelectric cell unit for detecting whether the longitudinal edge of a strip of fabric on the table is in alignment with the longitudinal edge of a length of fabric mounted on the main conveyor.

11. Apparatus according to claim 4 wherein a clamp is provided for holding stationary a continuous sheet of fabric mounted on the endless belt conveyor.

12. Apparatus according to claim 11 wherein said clamp comprises a member extending transversely of the endless belt conveyor and having perforations for connection to a vacuum pump and disposed in a position such that they will be covered by said sheet of fabric, the fabric being clamped to the member upon application of a vacuum to the perforations.

13. Apparatus according to claim 4 wherein a freely rotatable roller is provided for engagement with said sheet of fabric to press it into contact with the main conveyor.

14. Apparatus according to claim 13 wherein means is provided for lifting said roller when the fabric is held stationary by said clamp.

15. Apparatus according to claim 11 wherein means is provided for actuating said clamp, said means comprising a photoelectric cell unit for detecting whether an edge of the sheet of fabric has passed the means for bias-cutting the fabric by an amount such that a cut length of predetermined width is obtained.

16. Apparatus according to claim 15 comprising a carriage constrained to move in the longitudinal direction of the endless belt conveyor and carrying said photoelectric cell unit for detecting said sheet edge, said carriage being mechanically connected to the take-off conveyor whereby a change in the orientation of the take-off conveyor simultaneously adjusts the position of said cell unit.

17. Apparatus according to claim 4 wherein the take-off conveyor is provided at its end remote from the endless belt conveyor with a take-off spool for the joined lengths of fabric, said spool being mounted on a framework, and means being provided for moving the framework transversely with respect to the take-off conveyor.

18. Apparatus according to claim 17 wherein means is provided to move the framework transversely with respect to the take-off conveyor said means comprising a lead screw mounted on a supporting frame mounting said screw for the take-up conveyor, a screw-threaded block engaging said screw and drivably engaged with said framework, a motor for rotating the lead screw in either direction, a photoelectric cell unit attached to the framework and associated electronic apparatus for controlling the motor so as to maintain the photoelectric cell unit in alignment with a lateral edge of the joined lengths of fabric.

19. Apparatus according to claim 18 wherein the photoelectric cell unit is mounted on a carriage slidable transversely with respect to the take-off conveyor on a slide attached to the framework, means being provided for adjusting the position of said carriage on said slide.

20. Apparatus according to claim 17 wherein a photoelectric cell unit and associated electronic apparatus is provided for starting or for stopping a drive to said spool when a loop of fabric formed between said end of the take-up conveyor and the spool exceeds or does not exceed, respectively, a predetermined size.

21. Apparatus for forming a continuous length of bias-cut fabric which comprises an endless belt conveyor for conveying intermittently a fabric in a direction parallel to its side edges from a source of supply past a position for severing said fabric transversely to its side edges and after severance to a position for joining a side edge of said severed lengths to a side edge of a previously severed length, a cutting means at said position for severing said fabric transversely to its side edges into successive lengths, a take-off conveyor extending from said endless belt conveyor at said position for joining successive lengths of fabric in a direction parallel to the severed edges of said lengths to convey said joined lengths from said endless belt conveyor, and means for joining the adjacent side edges of a fabric length on said endless belt conveyor and a length of fabric on said take-off conveyor.

References Cited in the file of this patent

UNITED STATES PATENTS

| | | |
|---|---|---|
| 800,598 | Seiberling | Sept. 26, 1905 |
| 2,331,342 | Perry | Oct. 12, 1943 |
| 2,487,149 | Leguillon | Nov. 8, 1949 |
| 2,581,937 | Secrest | Jan. 8, 1952 |
| 2,696,244 | Jackson | Dec. 7, 1954 |
| 2,702,579 | Perry | Feb. 22, 1955 |
| 2,962,083 | Hasselquist | Nov. 29, 1960 |